US007719815B2

(12) United States Patent
Shato et al.

(10) Patent No.: US 7,719,815 B2
(45) Date of Patent: May 18, 2010

(54) SURGE ABSORBER

(75) Inventors: Yasuhiro Shato, Chichibu-gun (JP); Kouichirou Harada, Chichibu-gun (JP); Tsuyoshi Ogi, Chichibu-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 24 days.

(21) Appl. No.: 11/692,610

(22) Filed: Mar. 28, 2007

(65) Prior Publication Data

US 2007/0230081 A1 Oct. 4, 2007

(30) Foreign Application Priority Data

Mar. 29, 2006 (JP) ............................ 2006-089955
Dec. 14, 2006 (JP) ............................ 2006-336882
Dec. 28, 2006 (JP) ............................ 2006-356115

(51) Int. Cl.
*H02H 9/06* (2006.01)
*H02H 3/22* (2006.01)

(52) U.S. Cl. ..................................................... 361/120

(58) Field of Classification Search .................. 361/120
See application file for complete search history.

(56) References Cited

U.S. PATENT DOCUMENTS 2,562,692 A * 7/1951 Bigwood ..................... 337/27
2,599,848 A * 6/1952 Latour ......................... 218/48
3,153,127 A * 10/1964 Osmundsen et al. .......... 337/33
3,467,877 A * 9/1969 Fossen, Jr. et al. .......... 313/325
4,680,665 A * 7/1987 Bonnesen et al. ........... 361/120
4,739,439 A * 4/1988 Boy ........................... 361/120
4,858,059 A * 8/1989 Okura ........................ 361/124
5,718,593 A * 2/1998 Figueiredo et al. ......... 439/76.1
6,606,230 B2 8/2003 Sawada et al.
2007/0183112 A1* 8/2007 Kato .......................... 361/118

FOREIGN PATENT DOCUMENTS

JP 2005-63721 3/2005

OTHER PUBLICATIONS

U.S. Appl. No. 10/546,832, filed Aug. 25, 2005, Ueda, et al.

* cited by examiner

*Primary Examiner*—Ronald W Leja
(74) *Attorney, Agent, or Firm*—Oblon, Spivak, McClelland, Maier & Neustadt, P.C.

(57) ABSTRACT

In a surge absorber, a pair of protrusion electrodes is fixed to a pair of terminal electrode members at positions shifted from the center of the terminal electrode members to be point-symmetrical with the center of a ceramic insulator tube and a distance between the protrusion electrodes is adjusted so as to obtain a desired discharge starting voltage. As a result, it is possible to easily change the distance between the discharge electrodes without changing the length of the discharge electrodes.

8 Claims, 9 Drawing Sheets

SURGE ABSORBER

BACKGROUND OF THE INVENTION

1. Field of the Invention

The present invention relates to a surge absorber which is used for preventing an accident by protecting a variety of apparatuses from an abnormal voltage (surge voltage). The surge absorber is, for example, used as a lightning surge voltage or an electrostatic countermeasure for a variety of electronic apparatuses or a variety of apparatuses including electronic apparatuses.

Priority is claimed on Japanese Patent Application No. 2006-89955, filed on Mar. 29, 2006, Japanese Patent Application No. 2006-336882, filed on Dec. 14, 2006 and Japanese Patent Application No. 2006-356115, filed on Dec. 28, 2006 at the Japanese Patent Office, the disclosure of which is incorporated herein by reference.

2. Description of Related Art

A surge absorber is connected to a portion which is apt to be subjected to electric shock caused by lightning surge voltage or electrostatic surge voltage and the like, such as a portion in which an electronic apparatus for a communication apparatus such as a telephone, a facsimile machine or a modem device is connected to a communication line, a portion in which an electronic apparatus is connected to a power supply line, an antenna or a CRT driving circuit, in order to prevent damage due to heat or ignition of the electronic apparatus or a printed board having the electronic apparatus mounted thereon caused by abnormal voltage.

Recently, with the high-density mounting of electronic apparatuses, small-sized surface-mounted components are in demand even in a discharge type surge absorber for a communication line or a power supply line. In order to satisfy such demands, a surge absorber in which a pair of sealing electrodes is formed with a convex shape and can be surface-mounted with a small size is suggested (for example, see Japanese Unexamined Patent Application Publication No. 2005-63721).

In such a surge absorber, the distance between the electrodes needs to be adjusted in order to adjust the discharge starting voltage without changing an electrode material, sealing gas and a sealing gas pressure.

However, in the surge absorber disclosed in the above-described Publication, the length of the discharge electrode needs to be changed in order to change the distance between the electrodes and thus high manufacturing cost such as high manufacturing cost of a mold is incurred.

Conventionally, this type of a surge absorber includes a pair of discharge electrodes which is provided at a predetermined discharge gap in a sealing container having a predetermined dimension (Japanese Unexamined Patent Application Publication No. Hei 6-132065).

FIG. 15 shows an example of a conventional surge absorber. In this surge absorber S, a pair of lead wires 301*a* and 301*b* is provided at a predetermined gap and penetrate through a base 300 formed of an insulating material in an airtight manner. Discharge electrodes 302*a* and 302*b* formed of iron (Fe), nickel (Ni), copper (Cu) or an alloy thereof are provided in a parallel manner on one end of the pair of lead wires 301*a* and 301*b* and an airtight container 303 formed of the insulating material such as glass is provided on the base 300 to surround the discharge electrodes 302*a* and 302*b*. Discharge gas including inert gas such as argon (Ar) or nitrogen (N) gas is filled in the airtight container 303.

In the surge absorber S having the above-described configuration, the lead wires 301*a* and 301*b* are connected between the lines of protected apparatuses, for example, the lines of electronic apparatuses. When a surge is applied to the lines, an aerial discharge is generated between the discharge electrodes 302*a* and 302*b* and the surge is absorbed therebetween such that the electronic apparatus is protected from the surge.

However, in the surge absorber S, it is difficult to obtain a stable discharge starting voltage. In addition, when a powerful surge is applied, the discharge starting voltage increases and thus the function of the surge absorber may not be sufficiently accomplished.

SUMMARY OF THE INVENTION

An object of the present invention is to provide a surge absorber which is capable of easily changing the distance between discharge electrodes without changing the length of the discharge electrodes.

Furthermore, another object of the present invention is to provide a surge absorber which is capable of reliably accomplishing the function of the surge absorber by obtaining a stable high-precision discharge starting voltage.

In order to solve the above-described problems, the present invention provides the following means.

According to an aspect of the present invention, a surge absorber is provided including an insulator tube having a pair of terminal electrode members provided at both ends thereof and having a sealing gas sealed therein, wherein a pair of protrusion electrodes is fixed to inner surfaces of the pair of terminal electrode members to be protruded toward the opposite terminal electrode member, and wherein the pair of protrusion electrodes is shifted from a position where the protrusion electrodes face each other.

When the pair of protrusion electrodes fixed to the inner surfaces of the pair of terminal electrode members to be protruded toward the inside of the insulator tube or in an axial direction are shifted from the position where the protrusion electrodes face each other, it is possible to easily adjust the distance between the protrusion electrodes without changing the length of the protrusion electrodes.

In this surge absorber, it is preferably that the pair of protrusion electrodes is point-symmetrical with the center of the insulator tube.

In this case, since a trigger gap formed between the protrusion electrodes is formed in the vicinity of the center of the insulator tube, it is possible to stabilize a discharge starting voltage.

In this surge absorber, it is preferable that the distance from the front end to the rear end of the pair of protrusion electrodes is equal to or less than half of the distance between the terminal electrode members.

When the distance from the front end to the rear end of the pair of protrusion electrodes is equal to or less than a half of the distance between the terminal electrode members, it is possible to improve surge span characteristics.

In this surge absorber, it is preferable that the protrusion electrodes are formed in a spiral shape.

When the protrusion electrodes are formed in the spiral shape, since the length from the rear end to the front end of the protrusion electrode significantly increases, a fixing material flows onto the front end of the protrusion electrode by surface tension when the protrusion electrode is fixed to the terminal electrode member such that the characteristics of the electrode material can be prevented from being changed.

In this surge absorber, a coating containing silver may be formed on an outer surface of each of the protrusion electrodes. Accordingly, it is possible to significantly improve response. In particular, even when a steep surge is applied, it is possible to suppress the increase of the discharge starting voltage and thus to obtain a stable discharge starting voltage.

The protrusion electrodes may be fixed by caulking rear portions of the protrusion electrodes in holes formed in the terminal electrode members.

When the protrusion electrodes are strongly fixed to the terminal electrode members by caulking, it is possible to prevent a discharge distance from being changed while the protrusion electrodes are prevented from being bent due to impact such as external vibration or thermal impact such as repeated discharges, and the protrusion electrodes are prevented from removing from the terminal electrode members.

Furthermore, according to another aspect of the present invention, a surge absorber is provided in which a pair of rod-shaped discharge electrodes is maintained at a predetermined discharge gap in parallel in an airtight container, wherein at least inner side surfaces of the pair of discharge electrodes which face each other at the discharge gap include Ag or an Ag alloy.

In the surge absorber having the above-described configuration, a discharge occurs in the pair of discharge electrodes including Ag or an Ag alloy for stabilizing a discharge starting voltage and a surge is absorbed. Accordingly, the discharge starting voltage is in a predetermined stable range. Since a discharge occurs between the inner side surfaces of the rod-shaped discharge electrodes which are provided in parallel, it is possible to widen the discharge surface in a longitudinal direction of the discharge electrodes and thus to perform a stable discharge.

According to the surge absorber of the present invention, it is possible to ensure a large discharge area by the opposite inner side surfaces of the pair of rod-shaped discharge electrodes which are provided in parallel. In addition, since the material of the inner side surfaces includes Ag or an Ag alloy, the discharge starting voltage is in a stable range. Accordingly, even when a steep surge is applied, it is possible to reliably realize the function of the surge absorber without increasing the discharge starting voltage.

In this case, the inner side surfaces or the entire surfaces of the pair of discharge electrodes may be formed of Ag or an Ag alloy.

When the entire surfaces are formed of Ag or an Ag alloy, the pair of discharge electrodes may be formed of Ag or an Ag alloy or a coating layer formed of Ag or an Ag alloy may be provided on the pair of discharge electrodes.

In the surge absorber having the above-described configuration, since the large area of the surface is formed of Ag or an Ag alloy, it is possible to perform a more stable discharge.

DETAILED DESCRIPTION OF THE INVENTION

Figure 1:
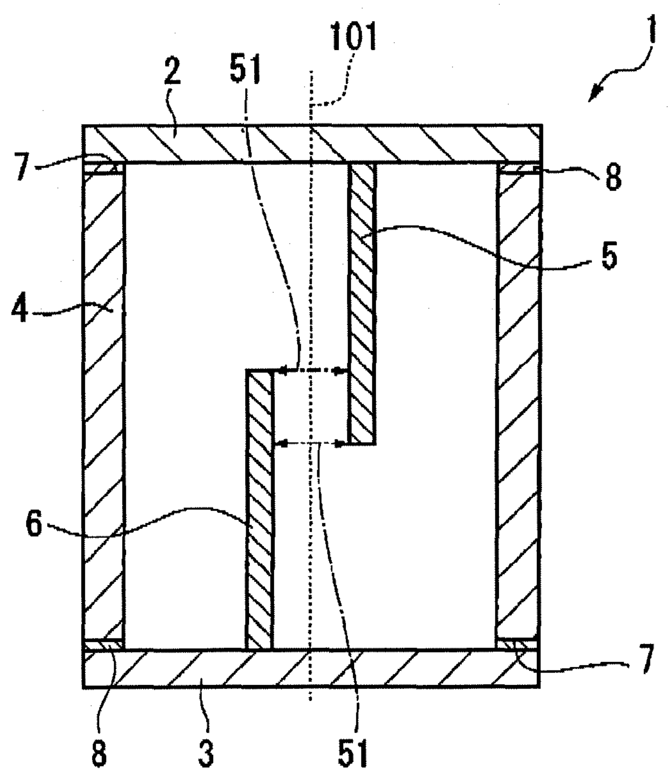
FIG. 1 is an axial section view showing a surge absorber according to a first embodiment of the present invention.

A first embodiment of the present invention will be described with reference to FIG. 1.

A surge absorber 1 according to the present embodiment is a discharge type surge absorber using a trigger gap. The surge absorber 1 has a rectangular parallelepiped shape and includes a pair of facing terminal electrode members 2 and 3, a ceramic insulator tube 4 of which both ends are provided with the terminal electrode members 2 and 3 and in which a gas such as argon (Ar) is sealed, and protrusion electrodes 5 and 6 which are respectively provided to the terminal electrode members 2 and 3 as shown in FIG. 1.

The pair of terminal electrode members 2 and 3 form of KOVAR (registered trademark) which is an alloy of nickel (Ni), cobalt (Co) and iron (Fe) or a 42 alloy which is an alloy of nickel (Ni) and iron (Fe), and formed of rectangular flat plate.

Meanwhile, the ceramic insulator tube 4 is formed of ceramic such as alumina ($Al_2O_3$) and the outer circumference thereof has the same rectangular frame-shaped transverse section as the outer circumference of the terminal electrode members 2 and 3. Both ends of the ceramic insulator tube 4 include metallization layers 7 having a two-layer structure including an alloy layer of molybdenum (Mo) and tungsten (W) and a nickel (Ni) layer. The ceramic insulator tube 4 is closed by the pair of terminal electrode members 2 and 3 at the ends including the metallization layers 7 through frame-shaped Ag—Cu based brazing filler metal 8 and argon gas is sealed in the ceramic insulator tube 4.

In the inner surfaces of the terminal electrode members 2 and 3, the protrusion electrodes 5 and 6 are slightly shifted from the centers of the terminal electrode members 2 and 3 and are protruded from a position, which is point-symmetrical with respect to the center of the ceramic insulator tube 4, toward the inside of the ceramic insulator tube 4 along an axis 101 of the ceramic insulator tube 4. The lengths of the protrusion electrodes 5 and 6 are slightly larger than half of the distance between the terminal electrode members 2 and 3. The protrusion electrodes 5 and 6 are formed of titanium (Ti), nickel (Ni) or an alloy of nickel (Ni) and iron (Fe) and are fixed to the terminal electrode members 2 and 3 by welding.

A trigger gap 51 is formed between the protrusion electrode 5 and the protrusion electrode 6.

Next, a method of manufacturing the surge absorber 1 according to the present embodiment having the above-described configuration will be described.

First, a pair of terminal electrode members 2 and 3 and protrusion electrodes 5 and 6 are formed. The protrusion electrode 5 is fixed to the terminal electrode member 2 by welding at a position which is shifted from the center of the terminal electrode member 2.

The protrusion electrode 6 is fixed to the terminal electrode member 3 by welding so as to be point-symmetrical to the protrusion electrode 5 fixed to the terminal electrode member 2 with respect to the center of the ceramic insulator tube 4.

Here, the protrusion electrode 5 and the protrusion electrode 6 are spaced apart from each other by a distance for obtaining a desired discharge starting voltage.

Next, at both ends of the ceramic insulator tube 4, an alloy layer of molybdenum (Mo) and tungsten (W) and a nickel (Ni) layer are formed in this order to form metallization layers 7 for improving wettability with frame-shaped brazing filler metal 8.

The solid brazing filler metal 8 is mounted on the terminal electrode member 2 fixed with the protrusion electrode 5 and the ceramic insulator tube 4 is mounted on the circumference of the terminal electrode member 2. The brazing filler metal 8 is mounted on the ceramic insulator tube 4 and the terminal electrode member 3 fixed with the protrusion electrode 6 is mounted thereon, thereby making a trial assembly.

After sufficient vacuuming, the trial assembly is heated at a sealing gas atmosphere such that the frame-shaped brazing filler metal 8 is molten and sealed and is then rapidly cooled, thereby manufacturing the surge absorber 1.

The manufactured surge absorber 1 is used by fixing the outer surfaces of the pair of terminal electrode members 2 and 3 of the surge absorber 1 to a land formed on a printed board by soldering.

When a surge voltage is applied to the surge absorber 1 having the above-described configuration, a discharge occurs in the trigger gap 51 of the surge absorber 1 and a main discharge occurs by argon (Ar) which is ionized by the discharge in the trigger gap 51. By reducing the surge voltage by the main discharge, an electronic apparatus attached with the surge absorber 1 can be protected from damage due to the surge voltage.

According to the surge absorber 1, although the length of the pair of protrusion electrodes 5 and 6 is not changed, it is possible to adjust the size of the trigger gap 51 by changing the position of the pair of protrusion electrodes 5 and 6 fixed to the pair of the terminal electrode members 2 and 3. Accordingly, it is possible to adjust the discharge starting voltage using the same electrode material, sealing gas and sealing gas pressure.

Next, a surge absorber 11 according to a second embodiment of the present invention will be described with reference to FIG. 2. In the following description, the components described in the first embodiment are denoted by the same reference numerals and the description thereof will be omitted.

Figure 2:
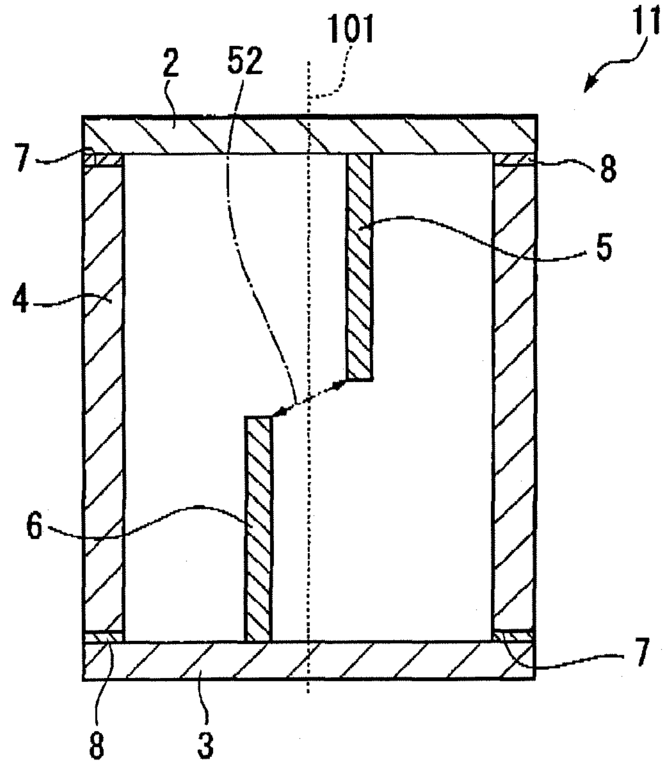
FIG. 2 is an axial section view showing a surge absorber according to a second embodiment of the present invention.

The second embodiment is different from the first embodiment in that the length of the pair of protrusion electrodes 5 and 6 is slightly smaller than half of the distance between the terminal electrode members 2 and 3, as shown in FIG. 2.

According to the surge absorber 11, although the length of the pair of protrusion electrodes 5 and 6 is not changed, it is possible to change the size of a trigger gap 52 by changing the position of the pair of protrusion electrodes 5 and 6 fixed to the pair of the terminal electrode members 2 and 3. Accordingly, the same effect as the first embodiment can be obtained. Even when the size of the trigger gap 52 between the protrusion electrodes 5 and 6 is excessively small by allowing the protrusion electrode 5 and the protrusion electrode 6 to approach the axis 101 of the ceramic insulator tube, the protrusion electrode 5 and the protrusion electrode 6 hardly contact each other by an attraction force which occurs between the protrusion electrodes 5 and 6 at the time of the discharge.

Figure 3:
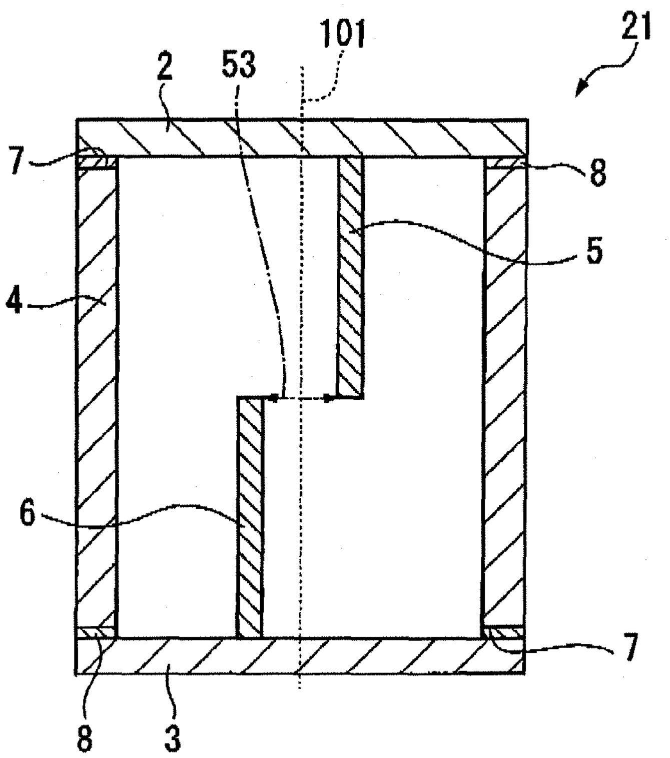
FIG. 3 is an axial section view showing a surge absorber in which the length of a protrusion electrode is identical to a half of the distance between terminal electrode members.

Although, in the first and second embodiments, the length of the pair of protrusion electrodes 5 and 6 is larger than half of the distance between the terminal electrode members 2 and 3 in the surge absorber 1 and the length of the pair of protrusion electrodes 5 and 6 is smaller than half of the distance between the terminal electrode members 2 and 3 in the surge absorber 11, the length of the pair of protrusion electrodes 5 and 6 may be accurately equal to half of the distance between the terminal electrode members 2 and 3, as shown in FIG. 3. Even in a surge absorber 21 shown in FIG. 3, although the length of the pair of protrusion electrodes 5 and 6 is not changed, it is possible to adjust the size of a trigger gap 53 by changing the position of the pair of protrusion electrodes 5 and 6 fixed to the pair of the terminal electrode members 2 and 3. Even when the size of the trigger gap 53 between the protrusion electrodes 5 and 6 is excessively small, the protrusion electrode 5 and the protrusion electrode 6 hardly contact each other by an attraction force which occurs between the protrusion electrodes 5 and 6 at the time of the discharge. Accordingly, the same effect as the second embodiment can be obtained.

Next, a third embodiment of the present invention will be described with reference to FIG. 4. In the following description, the components described in the first and second embodiments are denoted by the same reference numerals and the description thereof will be omitted.

Figure 4:
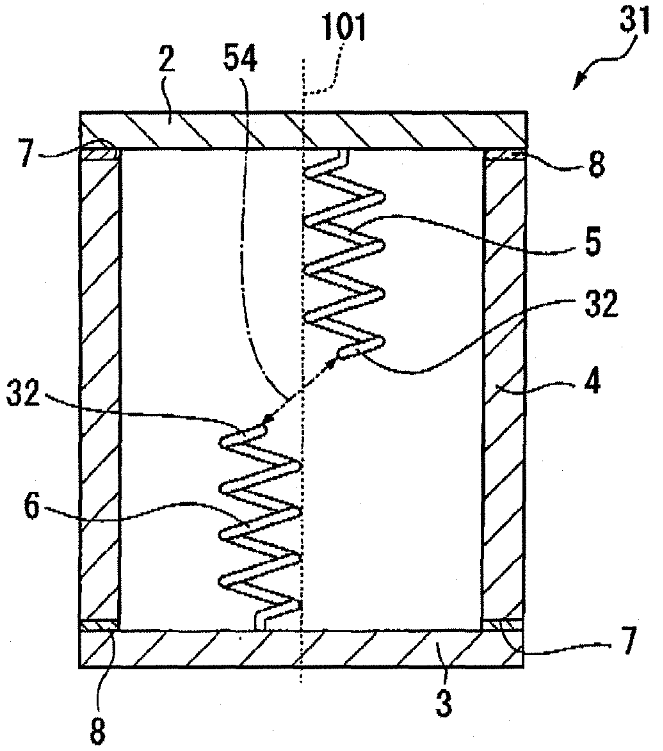
FIG. 4 is an axial section view showing a surge absorber according to a third embodiment of the present invention.

A surge absorber 31 according to the third embodiment is different from the first or second embodiment in that the pair of protrusion electrodes 5 and 6 is formed in a spiral shape, as shown in FIG. 4.

In the surge absorber 31, the protrusion electrodes 5 and 6, which respectively extend in the spiral shape from the inner surfaces of the terminal electrode members 2 and 3 toward the opposite terminal electrode members 3 and 2, are point-symmetrical with the center of the ceramic insulator tube 4. The front end of the protrusion electrode 5 and the front end of the protrusion electrode 6 become discharge portions 32 and a trigger gap 54 is formed between the discharge portions 32.

The surge absorber 31 according to the present embodiment is manufactured in the same order as the surge absorber 1 according to the first embodiment.

Here, the protrusion electrode 5 and the protrusion electrode 6 are positioned such that the distance between the discharge portions 32 becomes a distance for obtaining a desired discharge starting voltage.

According to the surge absorber 31, although the length from the front end to the rear end of the pair of spiral-shaped protrusion electrodes 5 and 6 is not changed, it is possible to adjust the size of the trigger gap 54 by changing the position of the pair of protrusion electrodes 5 and 6 fixed to the pair of the terminal electrode members. Accordingly, the same effect as the first embodiment can be obtained. Furthermore, according to the surge absorber 31, although the brazing filler metal 8 which is a sealing material flows into the bases of the spiral-shaped protrusion electrodes 5 and 6, the distance between the bases of the protrusion electrodes 5 and 6 and the discharge portions 32 can be significantly increased. Accordingly, it is possible to prevent the brazing filler metal 8 from reaching the discharge portions 32 by surface tension and thus to prevent the discharge starting voltage from being changed due to a variation in the material of the discharge portions 32.

Although, in the above-described embodiments, the pair of protrusion electrodes 5 and 6 is fixed to the pair of terminal electrode members 2 and 3 to be point-symmetrical with respect to the center of the ceramic insulator tube 4, the center of the point symmetry of the pair of protrusion electrodes 5 and 6 are not limited to the center of the ceramic insulator tube 4 and may be shifted from the center of the ceramic insulator tube 4 in a plane which is vertical to the axis 101 and includes the center of the ceramic insulator tube 4.

Figure 5:
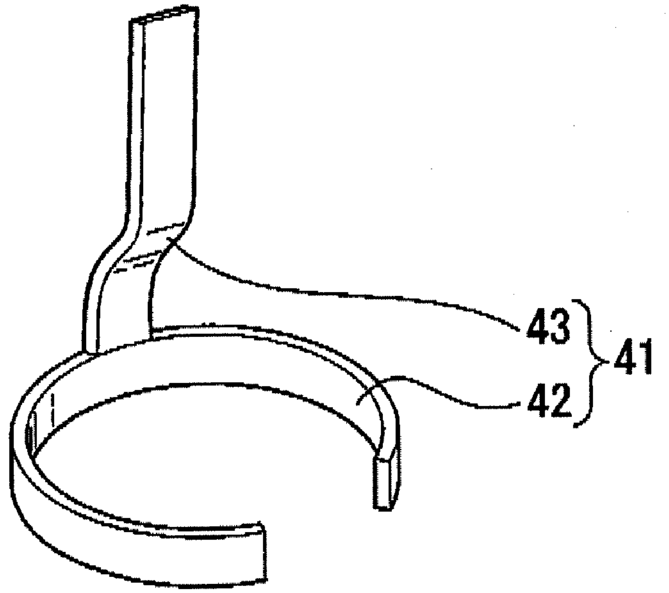
FIG. 5 is a perspective view showing an example of a protrusion electrode.

The pair of protrusion electrodes 5 and 6 is not limited to the spiral shape or the thin cylindrical shape such as a circular cylinder or a rectangular cylinder and may be a triangular pyramid of which the inner diameter of the circumference is reduced toward the front end thereof or a shape shown in FIG. 5 in which a metal flat plate manufactured by a punching process is rounded. A protrusion electrode 41 shown in FIG. 5 is formed by punching a thin metal plate made of titanium (Ti) to make a T-shaped plate, rounding a horizontal portion 42 corresponding to a horizontal rod of the T-shaped plate, and bending a vertical portion 43 corresponding to a vertical rod of the T-shaped plate toward the center of the rounded horizontal portion 42. In this case, the end of the rounded horizontal portion 42 is fixed to the terminal electrode member 2 and the terminal electrode member 3 by welding. In the protrusion electrode 41, since the protrusion electrode 41 can be manufactured by punching and bending the metal plate, it is possible to more cheaply manufacture the protrusion electrode 41 compared with the cone-shaped or spiral-shaped electrode.

Figure 6:
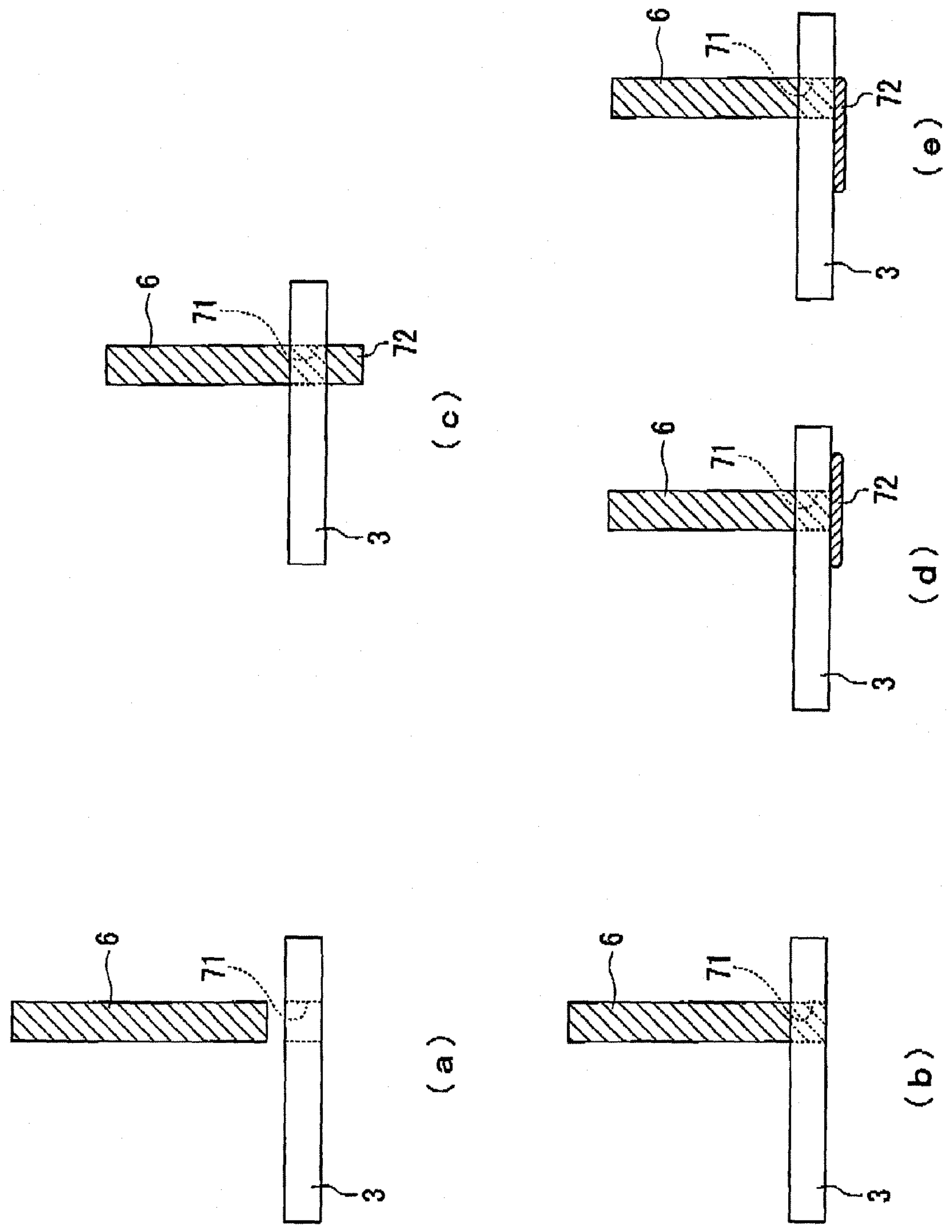
FIG. 6 is a longitudinal sectional view showing a method of fixing a protrusion electrode in process sequence.

Although, in the above-described embodiments, the protrusion electrodes 5 and 6 are fixed to the pair of terminal electrode members 2 and 3 by welding, the fixing method is not limited to the welding. Small holes 71 may be formed in the terminal electrode member 2 and 3 (in FIG. 6, the terminal electrode member 3) as shown in step (a) of FIG. 6, and then, the rear portions of the protrusion electrodes 5 and 6 (in FIG. 6, the protrusion electrode 6) may be injected into the holes 71 and may be fixed by a brazing filler metal, as shown in step (b) of FIG. 6. In addition, the protrusion electrode 6 may penetrates through the terminal electrode member 3 as shown in step (c) of FIG. 6, and then, an end 72 of the protrusion electrode 6 which penetrates through the terminal electrode member 3 may be fixed to the terminal electrode member 3 by pressing as shown in step (d) of FIG. 6. Alternatively, only the end 72 of the protrusion electrode 6 which penetrates the terminal electrode member 3 may be pressed and the end 72 may be bent with respect the terminal electrode member 3 by pressing such that the terminal electrode member 3 and the protrusion electrode 6 are fixed, as shown in step (e) of FIG. 6. Accordingly, it is possible to more stably fix the terminal electrode member 3 and the protrusion electrode 6.

Figure 7:
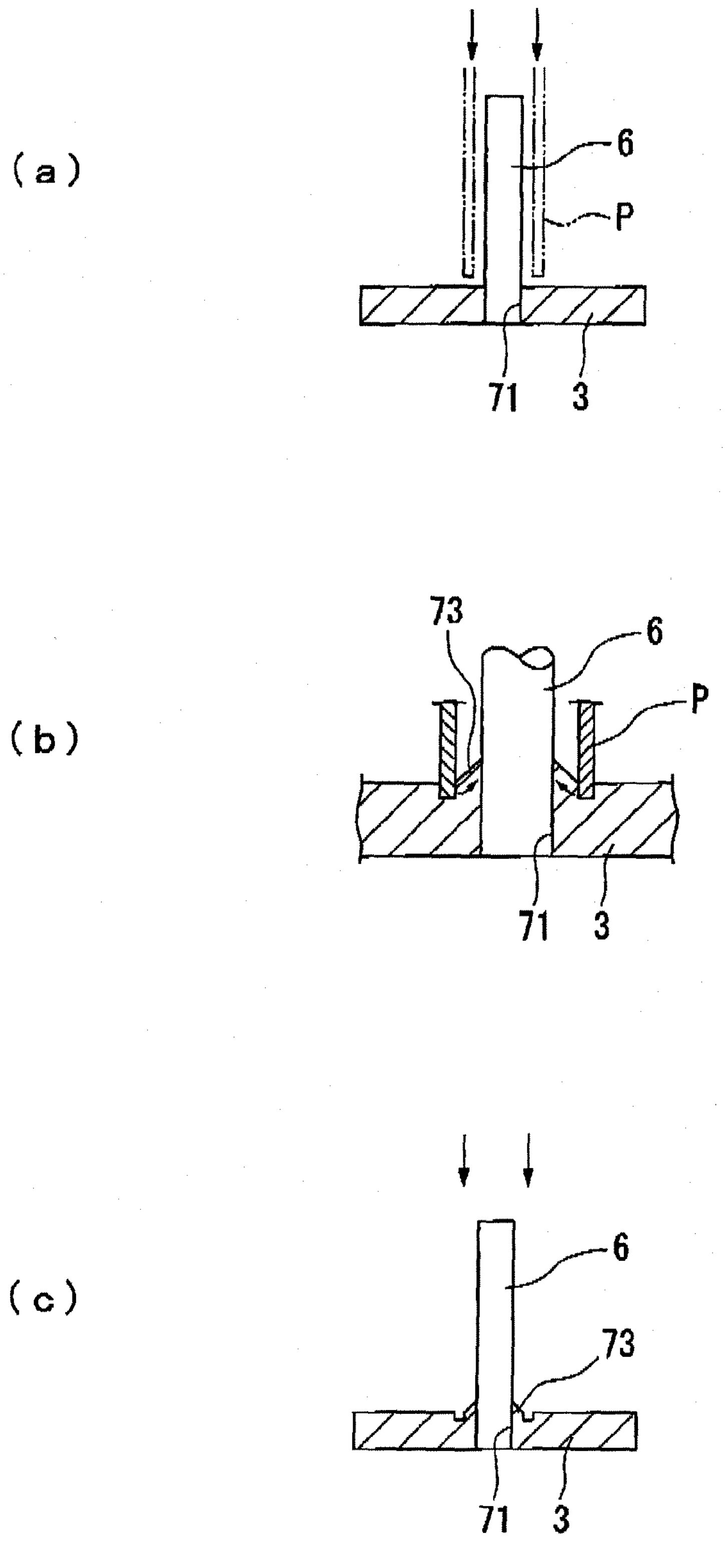
FIG. 7 is a longitudinal sectional view showing another method of fixing a protrusion electrode in process sequence.

As a method of fixing the protrusion electrodes 5 and 6 to the terminal electrode members 2 and 3, a caulking method shown in FIG. 7 may be used. As shown in step (a) of FIG. 7, the rear portions of the protrusions 5 and 6 (in FIG. 7, only the terminal electrode member 3 and the protrusion electrode 6 are shown) are injected into the holes 71 of the terminal electrode members 2 and 3 and the periphery of the hole 71 of the terminal electrode member 3 is pressed using a tubular punch P having an inner diameter larger than that of the protrusion electrode 6 and, as shown in step (b) of FIG. 7, such that the punch P is buried in the terminal electrode member 3. By pressing the punch P, a portion of the terminal electrode member 3 is pushed from the pressed point in a radius direction inward as denoted by an arrow of step (b) of FIG. 7 and a thick portion 73 allows the protrusion electrode 6 to be strongly fixed to the terminal electrode member 3 while reducing the hole 71, as shown in step (c) of FIG. 7.

When the protrusion electrodes 5 and 6 are tightly fixed to the terminal electrode members 2 and 3 by caulking, it is possible to prevent a discharge distance from being changed while the protrusion electrodes 5 and 6 are prevented from being bent due to impact such as external vibration or thermal impact such as repeated discharges or the protrusion electrodes 5 and 6 are prevented from escaping from the terminal electrode members 2 and 3.

The material of the protrusion electrode may be Fe, Cu, Mo, Mn, W, Ag, Al, Pd, Pt or an alloy of at least two thereof, in addition to Ti, Ni, an alloy of Fe and Ni. A conductive coating such as an $SnO_2$, SiC, ITO, TiC, TiCN, $BaAl_4$ or the above-described metal or an alloy thereof may be formed on the surface of the protrusion electrode by sputtering.

In this case, when metal including silver (Ag) is formed on the outer surface of the protrusion electrode, it is possible to further improve the response.

Figure 8:
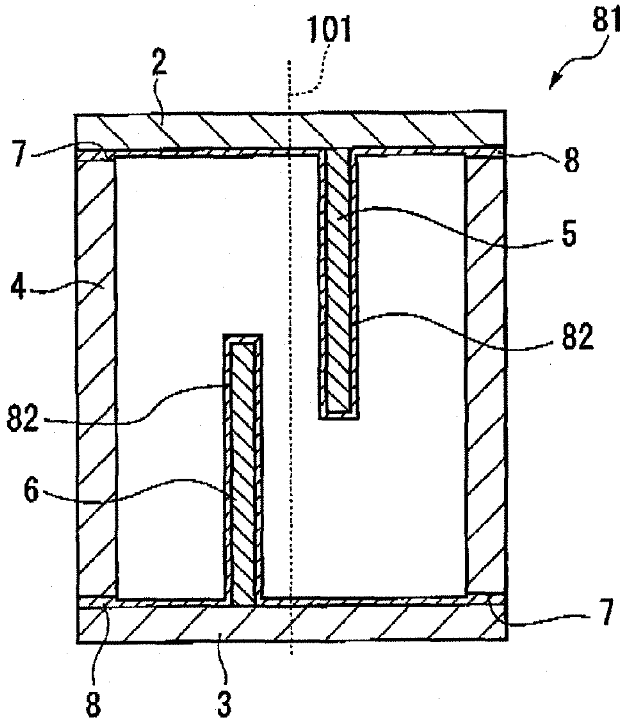
FIG. 8 is an axial sectional view showing a surge absorber in which a conductive coating is formed on a protrusion electrode.

FIG. 8 shows a surge absorber in which a conductive coating including silver is formed on the outer surface of a protrusion electrode. In this surge absorber 81, the conductive coating 82 formed on the protrusion electrodes 5 and 6 is formed of a brazing filler metal for fixing the insulator tube 4 and the terminal electrode members 2 and 3. An Ag—Cu based brazing filler metal may be used as the brazing filler metal 8. When the brazing filler metal 8 is molten, the brazing filler metal flows onto the protrusion electrodes 5 and 6 by the surface tension such that the conductive coating 82 is formed on the outer surfaces of the protrusion electrodes 5 and 6.

When this surge absorber 81 is manufactured, the rear portions or the protrusion electrodes 5 and 6 are injected into the terminal electrode members 2 and 3, solder sheets (not shown) having holes into which the protrusion electrodes 5 and 6 penetrate through the protrusion electrodes 5 and 6 to be coated on the terminal electrode members 2 and 3, and the insulator tube 4 are provided on the brazing filler metal such that the terminal electrode members 2 and 3 are mounted on both ends of the insulator tube 4 through the solder sheet. When this assembly is heated such that the brazing filler metal 8 is molten, the insulator tube 4 and the terminal electrode members 2 and 3 are fixed and the brazing filler metal on the surfaces of the terminal electrode members 2 and 3 flows onto the protrusion electrodes 5 and 6 to coat the outer surfaces of the protrusion electrodes 5 and 6 such that the conductive coating 82 is formed.

Figure 9:
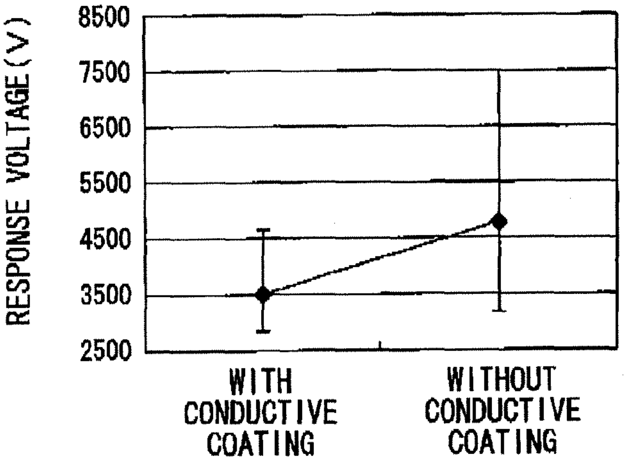
FIG. 9 is a graph showing response voltage characteristics of a protrusion electrode on which a conductive coating is formed and a protrusion electrode on which a conductive coating is not formed.

In order to compare the response characteristics of the surge absorber 81 having the above-described configuration and a surge absorber having no the conductive coating 82, a response voltage (discharge starting voltage) was measured when an impulse voltage which had 10 KV of a maximum value at 1.2 microsecond and had half of the maximum value at 50 microsecond was applied. As shown in FIG. 9, it can be seen that the surge absorber having the conductive coating had a low response voltage and a variation in the response voltage and thus had excellent response characteristics.

By coating the outer surfaces of the protrusion electrodes 5 and 6 with the conductive coating 82, it is possible to significantly improve the response and to suppress the increase of a discharge starting voltage even when a steep surge is applied such that a stable discharge starting voltage can be obtained.

Next, a surge absorber according to a fourth embodiment of the present invention will be described with reference to the drawings.

Figure 10:
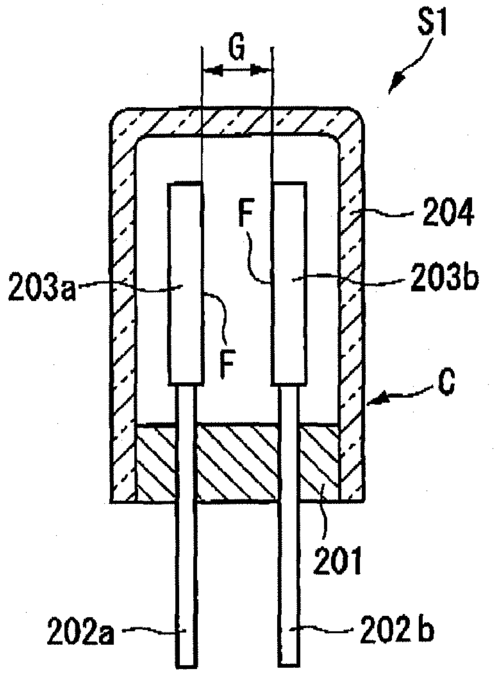
FIG. 10 is a longitudinal sectional view showing a surge absorber according to a fourth embodiment of the present invention.

FIG. 10 is a longitudinal sectional view showing the surge absorber according to the fourth embodiment of the present invention.

In a surge absorber S1, a pair of lead wires 202*a* and 202*b* made of a conductive wire such as Durmet wire (copper coated Fe—Ni alloy line) is provided at a predetermined gap and penetrates through a base 201 formed of an insulating material in an airtight manner. At the front end sides of the lead wires 202*a* and 202*b* (upper side of FIG. 10), rod-shaped discharge electrodes 203*a* and 203*b* having a predetermined length and formed of Ag or an Ag alloy such as Ag—Cu are provided at a discharge gap G in parallel. That is, in the surge absorber S1 according to the present embodiment, the rod-shaped discharge electrodes 203*a* and 203*b* formed of Ag or an Ag alloy are fixed to the front ends of the lead wires 202*a* and 202*b*.

An airtight container member 204 formed of glass is fixed to the base 201 using an adhesive to surround the discharge electrodes 203*a* and 203*b*. In an airtight container C surrounded by the airtight container member 204 and the base 201, discharge gas (sealing gas) formed of rare gas such as argon (Ar), neon (Ne), helium (He) or xenon (Xe) or inert gas such as nitrogen gas is filled.

In the surge absorber S1 having the above-described configuration, the lead wires 202*a* and 202*b* are connected between the lines of protected apparatuses, for example, the lines of the electronic apparatuses. When a surge is applied to the lines, an aerial discharge is generated between the discharge electrodes 203*a* and 203*b* and the surge is absorbed such that the electronic apparatus is protected from the surge. In this surge absorber S1, the discharge electrodes 203*a* and 203*b* are formed in a rod shape and provided in parallel and the inner surfaces F of the discharge electrodes become discharge surfaces such that the discharge surfaces have relatively large areas in the longitudinal directions of the discharge electrodes 203*a* and 203*b*. Accordingly, since a discharge occurs between the discharge electrodes 203*a* and 203*b* having large areas such that the surge is absorbed, it is possible to obtain a stable discharge starting voltage.

Furthermore, since the discharge electrodes 203*a* and 203*b* are formed of Ag or an Ag alloy for stabilizing a discharge starting voltage at the time of the aerial discharge, the discharge starting voltage is in a predetermined stable range. Accordingly, when a steep surge is applied, the discharge starting voltage does not increase, and the function of the surge absorber can be surely realized, thereby obtaining a more stable discharge starting voltage. In addition, when a portion of the surface of the discharge electrodes 203*a* and 203*b* is scattered by repeated discharges, it is possible to obtain a stable discharge starting voltage for a long time.

Figure 11:
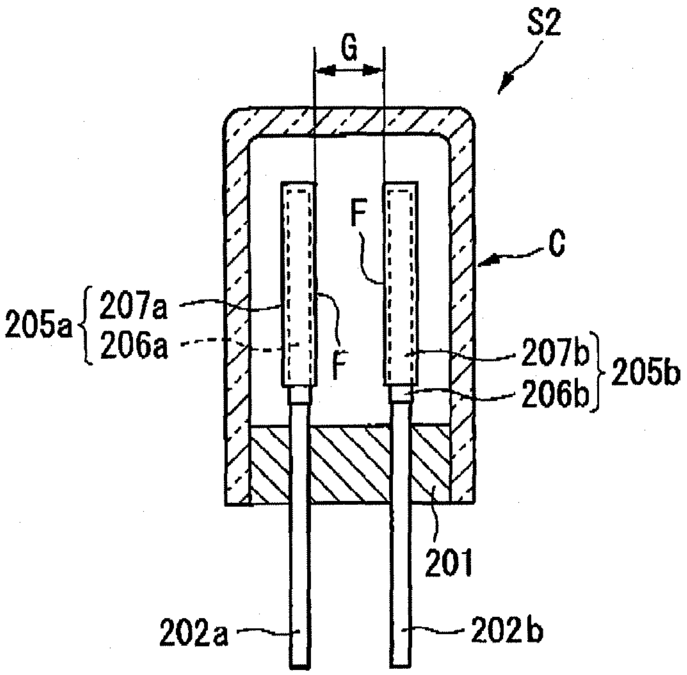
FIG. 11 is a longitudinal sectional view showing a surge absorber according to a fifth embodiment of the present invention.

FIG. 11 is a longitudinal sectional view showing a surge absorber according to a fifth embodiment of the present invention. In this figure, the components described in the fourth embodiment are denoted by the same reference numerals and the description thereof will be simplified.

In the surge absorber S2, discharge electrodes 205*a* and 205*b* respectively connected to the front ends of lead wires 202*a* and 202*b* have rod-shaped shafts 206*a* and 206*b* having a predetermined length and formed of Fe, Ni, Cu or an alloy thereof and coating layers 207*a* and 207*b* formed of Ag or an Ag alloy are formed on the entire surfaces of the shafts 206*a* and 206*b*.

In this case, the lead wires 202*a* and 202*b* may be used as the shafts by extending the lead wires 202*a* and 202*b,* instead of separately providing the rod-shaped shafts 206*a* and 206*b* and the lead wires 202*a* and 202*b*.

The coating layers 207*a* and 207*b* formed on the shaft 206*a* and 206*b* and made of Ag may be easily formed by plating the shafts 206*a* and 206*b* with Ag. Alternatively, the coating layers may be formed on the surfaces of the shafts 206*a* and 206*b* by a printing method or a sputtering method.

Even in the surge absorber S2 having the above-described configuration, since the outer surfaces of the discharge electrodes 205*a* and 205*b* are formed of Ag or an Ag alloy for stabilizing a discharge starting voltage, the discharge starting voltage is in a predetermined stable range. Accordingly, when a steep surge is applied, the discharge starting voltage does not increase and the function of the surge absorber can be surely realized. In addition, since the coating layers 207*a* and 207*b* made of Ag are provided on the entire surfaces of the discharge electrodes 205*a* and 205*b,* it is possible to obtain a more stable discharge starting voltage in a larger area and thus obtain a stable discharge starting voltage for a long time.

Figure 12:
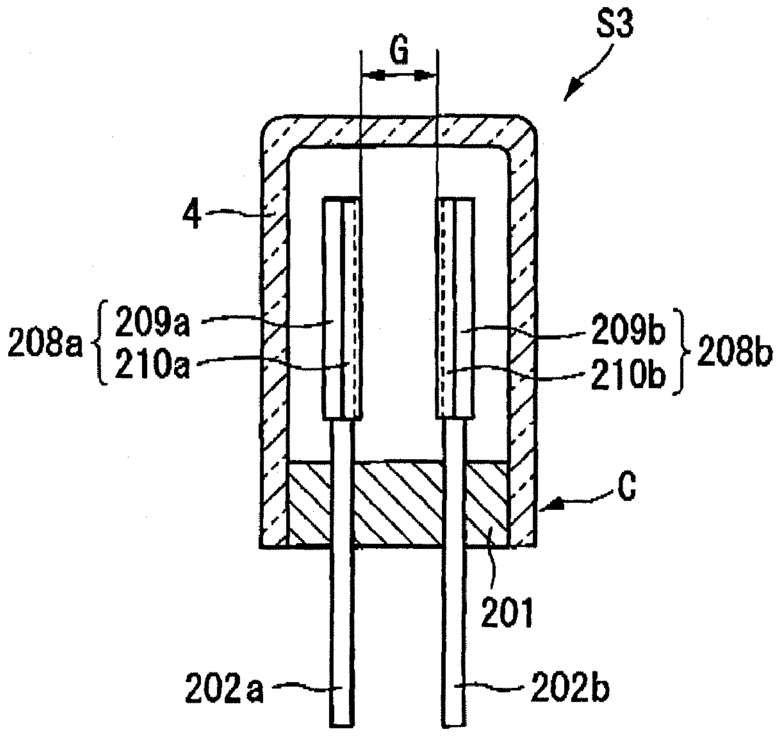
FIG. 12 is a longitudinal sectional view showing a surge absorber according to a sixth embodiment of the present invention.
Figure 13:
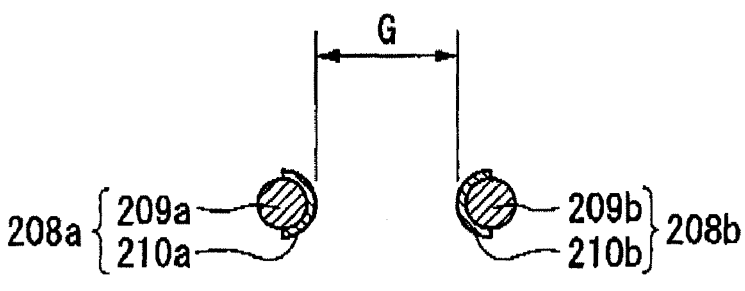
FIG. 13 is a transverse sectional view showing a discharge electrode according to the embodiment of FIG. 12.

FIGS. 12 and 13 are longitudinal sectional views showing a surge absorber according to a sixth embodiment of the present invention.

In a surge absorber S3, discharge electrodes 208*a* and 208*b* respectively connected to the front ends of lead wires 202*a* and 202*b* have rod-shaped shafts 209*a* and 209*b* having a predetermined length and formed of Fe, Ni, Cu or an alloy thereof and coating layers 210*a* and 210*b* formed of Ag or an Ag alloy are formed on the inner surfaces F of the outer surfaces of the shafts 209*a* and 209*b,* which face each other through a discharge gap G. In the example shown in FIGS. 12 and 13, the coating layers 210*a* and 210*b* are formed on the side surfaces corresponding to substantially half of the discharge electrodes 208*a* and 208*b*. Even in this case, the lead wires 202*a* and 202*b* may be sued as the rod-shaped shafts 209*a* and 209*b* by extending the lead wires 202*a* and 202*b*.

Even in the surge absorber S3 having the above-described configuration, since the discharge portions are formed of Ag or an Ag alloy for stabilizing a discharge starting voltage, the discharge starting voltage is in a predetermined stable range. Accordingly, when a steep surge is applied, the discharge starting voltage does not increase and the function of the surge absorber can be sufficiently realized. In addition, since the inner side surfaces corresponding to substantially half of the discharge electrodes 208*a* and 208*b* are coated with expensive Ag, it is possible to more cheaply manufacture the surge absorber, compared with a case where the entire surfaces of the discharge electrodes 208*a* and 208*b* are formed of Ag.

EMBODIMENT

The discharge characteristics of the surge absorber according to the fourth embodiment were measured while comparing with the metal other than Ag.

Figure 14:
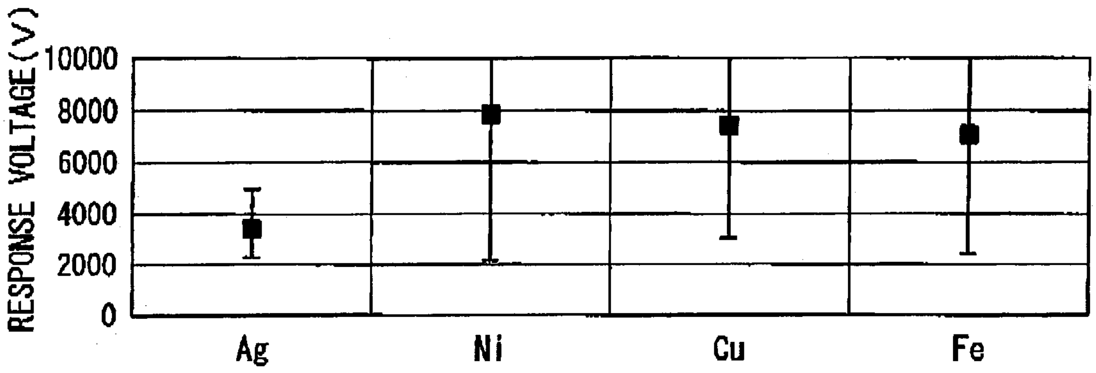
FIG. 14 is a graph showing response voltage characteristics of a discharge electrode according to the present invention and a conventional discharge electrode.
Figure 15:
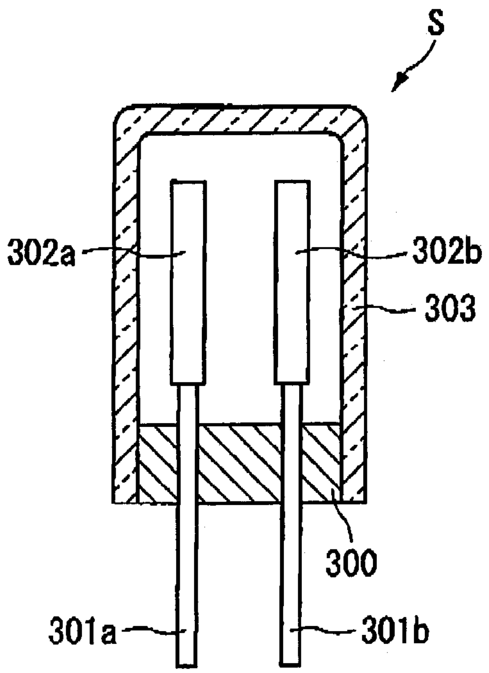
FIG. 15 PRIOR ART
FIG. 15 is a longitudinal sectional view showing a conventional surge absorber.

FIG. 14 is a graph showing response voltage characteristics when the material of the discharge electrode was Ag, Ni, Cu and Fe. The impulse voltage which had 10 KV of a maximum value at 1.2 microsecond and had half of the maximum value at 50 microsecond was applied as a surge voltage. The discharge starting voltage at the time was measured as the response voltage. In FIG. 14, the response voltages of the respective materials are shown.

As can be seen from FIG. 14, in a case of the discharge electrode formed of Ag according to the present invention, the response voltage (discharge voltage) is lower than those of the discharge electrodes formed of the other materials and a variation in the response voltage was small, thereby obtaining a stable high-precision discharge starting voltage.

The technical range of the present invention is not limited to embodiments and may be variously changed without departing from the scope of the present invention. That is, the present invention is not restricted by the above description and is defined by only claims.

For example, the pair of terminal electrode members 2 and 3 in the first to third embodiments may be a Cu or Ni based alloy.

The metallization layers 7 provided on the both ends of the ceramic insulator tube 4 may be Ag, Cu, Au or a Mo—Mn alloy and only the brazing filler metal 8 formed of active metal brazing may be sealed without using the metallization layer 7.

The sealing gas may be, for example, air having an adjusted composition in order to obtain desired characteristics or may be Ar, $N_2$, Ne, He, Xe, $H_2$, $SF_6$, $C_2F_6$, $C_3F_8$, $CO_2$ or a mixture thereof.

When the conductive coating is formed on the protrusion electrode, a plating method, a printing method or a sputtering method may be employed instead of the method of using the brazing filler metal.

In the fourth to sixth embodiments, the discharge electrode may be, for example, an elementary substance such as Ag or Ag alloy. In the case of using an Ag alloy, the cost can be more decreased. The discharge electrode may be formed of Ag or an Ag alloy or a coating layer formed of Ag or an Ag alloy may be formed on the surface of the discharge electrode. In addition, the discharge electrode may include Ag or an Ag alloy and may be, for example, a mixture of other metals or an insulating material.

Although the airtight container C for receiving the discharge electrodes is formed by the base 201 and the airtight container member 204 in the above-described embodiments, the airtight container may be configured by melting and closing both ends of a cylindrical container formed of one glass tube, if the discharge electrodes are maintained in parallel.

What is claimed is:

1. A surge absorber comprising:

an insulator tube having an opening at both ends thereof and insulating properties;

a pair of terminal electrode members which is fixed in state of closing the opening and which has electrical conductivity and is in contact with the insulator tube;

gas which is sealed within the insulator tube;

a pair of protrusion electrodes each of which is fixed to an inner side of a respective terminal electrode member and has electrical conductivity;

wherein the pair of protrusion electrodes is shifted from a position where the protrusion electrodes face each other, and the pair of protrusion electrodes is point-symmetrical with a center of the insulator tube.

2. The surge absorber according to claim 1, wherein a distance from a front end to a rear end of the pair of protrusion electrodes is equal to or less than a half of a distance between the terminal electrode members.

3. The surge absorber according to claim 1, wherein the protrusion electrodes are formed in a spiral shape.

4. The surge absorber according to claim 1, wherein a coating containing silver is formed on an outer surface of each of the protrusion electrodes.

5. The surge absorber according to claim 1, wherein the protrusion electrodes are fixed by caulking rear portions of the protrusion electrodes in holes formed in the terminal electrode members.

6. The surge absorber according to claim 1, wherein an inner surface of each of the terminal electrode members is flat.

7. The surge absorber according to claim 1, wherein each of the terminal electrode members is in plate form.

8. The surge absorber according to claim 1, wherein the protrusion electrode is fixed straight to the flat inner surface of each of the terminal electrode members by welding, and each of the terminal electrode members is brazed to the insulator tube.

* * * * *